(12) United States Patent
Wong

(10) Patent No.: US 7,394,025 B1
(45) Date of Patent: Jul. 1, 2008

(54) APPARATUS FOR PROTECTING CABLES OR OTHER ELONGATED OBJECTS FROM TRAFFIC DAMAGE

(76) Inventor: Thomas K. Wong, 795 Panorama Dr., San Francisco, CA (US) 94131

( * ) Notice: Subject to any disclaimer, the term of this patent is extended or adjusted under 35 U.S.C. 154(b) by 59 days.

(21) Appl. No.: 11/514,001

(22) Filed: Aug. 30, 2006

(51) Int. Cl.
    *H02G 3/04* (2006.01)
(52) U.S. Cl. .................. 174/135; 174/68.1; 174/50; 104/275; 430/364
(58) Field of Classification Search ................ 174/136, 174/135, 68.1, 506, 101, 70 C, 70 R, 50, 174/481, 482, 484, 72 C, 97; 104/275; 52/590, 52/590.1; 430/364; D13/155, 156, 154; 14/69.5; 220/3.2, 3.3; 248/74.1, 74, 68.1; 138/103, 105, 106, 110; 404/3
    See application file for complete search history.

(56) References Cited

U.S. PATENT DOCUMENTS

| | | | |
|---|---|---|---|
| 2,299,356 A | 10/1942 | Strohm et al. | |
| 3,357,370 A | 12/1967 | Walkey | |
| 3,441,084 A * | 4/1969 | Fredd | 166/250.01 |
| 3,888,186 A | 6/1975 | Jentzsch et al. | |
| 3,965,967 A | 6/1976 | Jentzsch et al. | |
| 5,095,822 A | 3/1992 | Martin | |
| 5,463,385 A | 10/1995 | Tyburski | |
| 5,489,458 A | 2/1996 | Sato et al. | |
| 5,777,266 A | 7/1998 | Herman et al. | |
| D412,490 S | 8/1999 | Henry | |
| D415,112 S * | 10/1999 | Henry | D13/155 |
| D415,471 S * | 10/1999 | Henry | D13/155 |
| D418,818 S | 1/2000 | Henry | |
| D429,695 S | 8/2000 | Henry | |
| D436,578 S | 1/2001 | Henry | |
| D437,832 S | 2/2001 | Henry | |
| 6,202,565 B1 | 3/2001 | Henry | |
| 6,481,036 B1 | 11/2002 | Duvall | |
| 6,499,410 B1 | 12/2002 | Berardi | |
| 6,747,212 B1 | 6/2004 | Henry | |
| 6,878,881 B1 | 4/2005 | Henry | |
| 7,145,078 B2 * | 12/2006 | Henry | 174/101 |
| 7,145,079 B1 * | 12/2006 | Henry | 174/101 |

OTHER PUBLICATIONS

Commercially available cable protectors made available under the Linebacker trademark by CableRamps.com of Phoenix, Arizona and Megaduct cover made by Geist Manufacturing, Inc., of Lincoln, Nebraska.

* cited by examiner

*Primary Examiner*—Dhiru R Patel
(74) *Attorney, Agent, or Firm*—Thomas R. Lampe

(57) ABSTRACT

Cables or other elongated objects are protected from traffic by a plurality of double-ended protector members disposed end to end and interconnected by flexible connector structure allowing bending between adjacent protector members.

17 Claims, 2 Drawing Sheets

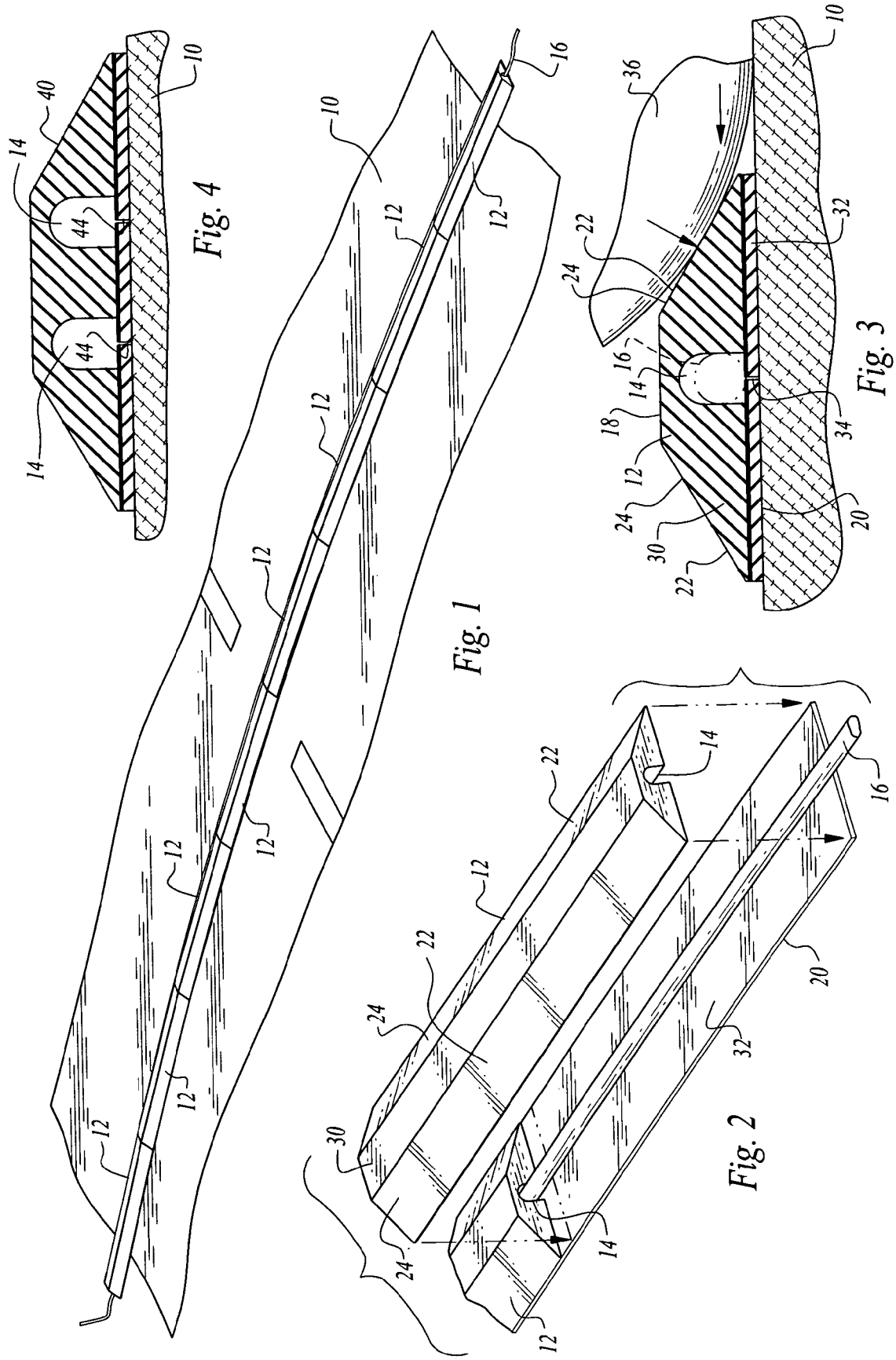

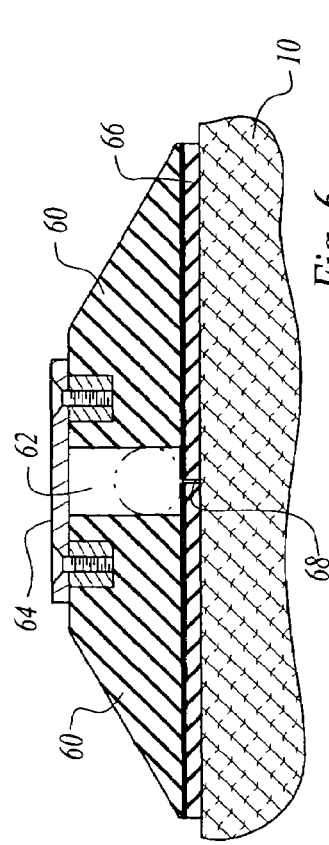
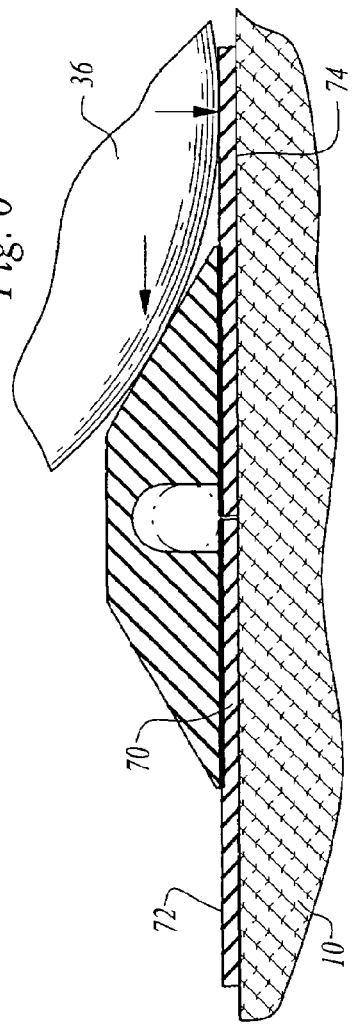
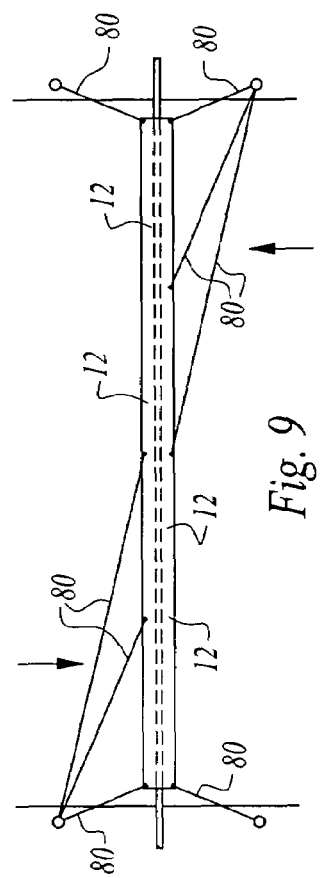
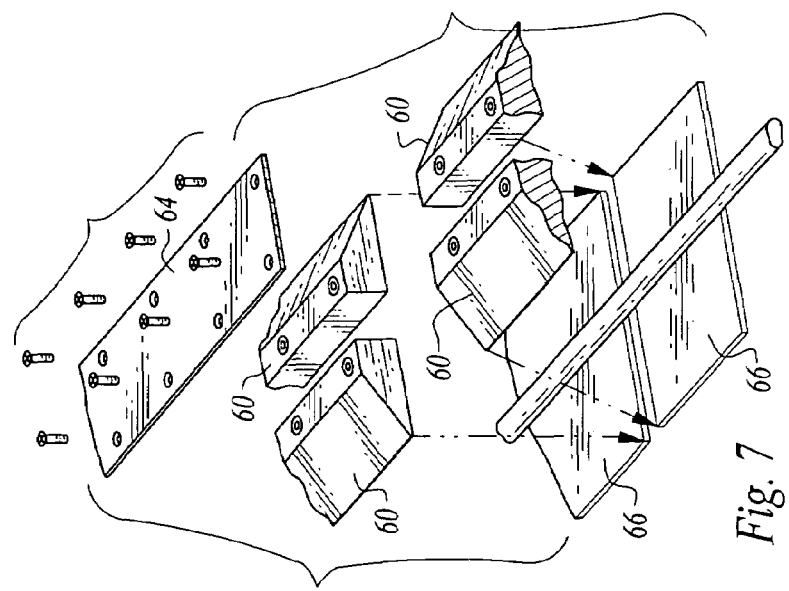

APPARATUS FOR PROTECTING CABLES OR OTHER ELONGATED OBJECTS FROM TRAFFIC DAMAGE

TECHNICAL FIELD

This invention relates to apparatus for positioning on a road or other support surface to protect one or more cables, cords, hoses, pipes or other elongated objects from traffic damage.

BACKGROUND OF THE INVENTION

Devices commonly known as cable protectors or cable covers used to protect cables, cords, hoses, pipes or other elongated objects from traffic damage are well known. These devices are positioned over road and other surfaces and incorporate one or more channels or cavities accommodating the elongated objects to be protected.

Common materials employed to manufacture cable protectors include rubber, polyvinyl chloride and polyurethane. Rubber and PVC protectors offer longer sections of up to twelve feet in length. The stronger polyurethane protectors typically come in three feet long interlocking sections. Softer and more flexible material such as rubber and PVC can conform to the curved road surface (for drainage), therefore are not susceptible to dislocation by vehicle traffic, and can be offered in longer lengths. The stronger materials such as polyurethane are more rigid, therefore the cable protector must be in shorter segments so that the protector can conform better to the curved road surface. To hold the many small sections together, interlocking joints are built into both ends of each section, which significantly add to cost. In general, currently available cable protectors function rather well within their respective loading classification but with one major short coming: high cost. A protector for medium traffic load on a small residential street (about 20 feet wide) can cost as much as one thousand dollars or more.

The state of the prior art is exemplified by the following United States patents: U.S. Pat. No. 5,777,266, issued Jul. 7, 1998, U.S. Pat. No. 6,202,565, issued Mar. 20, 2001, U.S. Pat. No. 6,481,036, issued Nov. 19, 2002, U.S. Pat. No. 6,499,410, issued Dec. 31, 2002, U.S. Pat. No. 5,095,822, issued Mar. 17, 1992, U.S. Pat. No. 6,878,881, issued Apr. 12, 2005, U.S. Pat. No. 6,747,212, issued Jun. 8, 2004, U.S. Pat. No. 3,888,186, issued Jun. 10, 1975, U.S. Pat. No. 3,965,967, issued Jun. 29, 1976, U.S. Pat. No. 2,299,356, issued Oct. 20, 1942, U.S. Pat. No. 3,357,370, issued Dec. 12, 1967, U.S. Pat. No. 5,463,385, issued Oct. 31, 1995, U.S. Pat. No. 5,489,458, issued Feb. 6, 1996, U.S. Design Pat. No. D412,490, issued Aug. 3, 1999, U.S. Design Pat. No. D418,818, issued Jan. 11, 2000, U.S. Design Pat. No. D429,695, issued Aug. 22, 2000, U.S. Design Pat. No. D436,578, issued Jan. 23, 2001 and U.S. Design Pat. No. D437,832, issued Feb. 20, 2001. Exemplary of commercially available cable protectors are those made available under the Linebacker trademark by CableRamps.com of Phoenix, Ariz. and the Megaduct cover made by Geist Manufacturing, Inc., of Lincoln, Nebr.

DISCLOSURE OF INVENTION

The apparatus of the present invention is a low cost but effective approach for protecting one or more cables, cords, hoses, pipes or other elongated objects from traffic damage. The apparatus is extremely easy to manufacture and deploy.

The apparatus includes a plurality of double-ended protector members disposed end to end, each protector member defining an elongated, open-ended cavity extending between the ends thereof for receiving one or more elongated objects.

Each protector member has an protector member top, a protector member bottom having an elongated opening therein communicating with the elongated, open-ended cavity and opposed protector member sides between the protector member top and the protector member bottom having tire engagement surfaces slanting outwardly and downwardly. The force vector of a moving tire engaging a tire engagement surface will exert a downward force on the protector member urging the protector member in the direction of the support surface and increasing frictional force between the support surface and the protector member to resist slidable movement of a protector member relative to the road or other support surface.

The apparatus also includes flexible connector structure attached to the plurality of protector members and extending between adjacent ends thereof to maintain the protector members disposed end to end while enabling bending to occur between adjacent protector members whereby the apparatus will substantially conform to the shape of the support surface where the apparatus is positioned.

Other features, advantages and objects of the present invention will become apparent with reference to the following description and accompanying drawings.

BRIEF DESCRIPTION OF DRAWINGS

FIG. 1 is a perspective view illustrating a first embodiment of apparatus constructed in accordance with the teachings of the present invention extending across a roadway and protecting a cable against damage by traffic;

FIG. 2 is an exploded view illustrating components of the apparatus, including one complete protector member and an end portion of a second protector member;

FIG. 3 is a cross-sectional view of a protector member of the embodiment of FIG. 1, positioned on a roadway and being engaged by the tire of a vehicle;

FIG. 4 is a cross-sectional view of an alternative form of protector member positioned on a roadway;

FIG. 5 is a view similar to FIG. 4, but illustrating a third embodiment of the invention;

FIG. 6 is a view similar to FIGS. 4 and 5 and illustrating a fourth embodiment of the invention;

FIG. 7 is an exploded view illustrating components of the embodiment of FIG. 6 prior to assembly thereof, including end portions of two adjacent protector members;

FIG. 8 is a view similar to FIG. 3, but illustrating a fifth embodiment of the invention being engaged by the tire of a vehicle; and FIG. 9 is an elevational view of yet another embodiment of the invention, including hold down structure.

MODES FOR CARRYING OUT THE INVENTION

Referring now to FIGS. 1, 2 and 3, apparatus constructed in accordance with the teachings of the present invention is illustrated. FIGS. 1 and 3 depict a support surface in the form of a road 10. The apparatus includes a plurality of double-ended protector members 12 disposed end to end positioned on the road and extending thereacross.

Each protector member 12 defines an elongated, open-ended cavity or channel 14 extending between the ends thereof for receiving one or more elongated objects, in this instance an electrical cable 16. Each protector member 12 has a protector member top 18, a protector member bottom 20 and opposed protector member sides 22 between the protector member top and the protector member bottom. The opposed protector member sides 22 have outer tire engagement surfaces 24 slanting outwardly and downwardly.

Each protector member 22 is of two-part construction, including an upper portion 30 and a lower portion 32 adhesively or otherwise secured together. The lower portion 32 is in the form of a continuous high friction sheet backing material, such as rubber, attached to the underside of upper portion 30. An elongated opening in the form of slit 34 in the backing communicates with the elongated, open-ended cavity 14 and extends therealong. A conduit or other elongated object is inserted into the cavity through the slit, the backing being sufficiently flexible to allow both insertion of the elongated member object into the cavity and removal therefrom, as desired.

The flexible backing or lower portion 32 extends between adjacent protector members and between adjacent ends thereof to maintain the protector members disposed end to end while enabling bending between adjacent protector members to accommodate, for example, road surface curvature or other variations. In other words, the backing in this embodiment not only comprises the lower portion of each protector member, but also acts as flexible connector structure interconnecting adjacent protector members to maintain their end-to-end orientation. Preferably, a small gap or space exists between the ends of adjacent protector members.

Various types of low cost yet strong materials may be used in the construction of upper portions 30, as long as they are strong enough for the traffic load. This includes materials that are strong but not highly durable such as lumber. This invention therefore offers a choice of extremely low cost, but effective, cable protectors for short life cycle applications.

For medium life cycle applications, synthetic lumber (sometimes referred to as recycled plastic lumber) may be utilized. Such material is strong enough to endure heavy traffic loading and is durable and weather resistant at the same time.

FIG. 3 provides a diagrammatic representation of what happens when a tire 36 of a moving vehicle impacts the slanted outer wall of one of the protector member sides 22. The force vector of the moving tire when engaging the tire engagement surface will exert a downward force on the protector member urging the protector member in the direction of the road and increase frictional force between the road and the protector member to resist slidable movement of the protector member relative to the road. The frictional coefficient of the lower portion or backing must be sufficiently high for the particular road surface so that the forward impact force from the moving tire will not dislocate the protector members from their original positions.

FIG. 4 shows an alternative embodiment of protector member designated by reference numeral 40. In this arrangement two parallel elongated, open-ended cavities 14 are formed. The lower portion or backing 42 has two slits 44 formed therein communicating with cavities 14 so that elongated members (not shown) may be disposed side-by-side in the protector member 40.

Another embodiment of the invention is shown in FIG. 5. The protector member 50 corresponds in all respects to previously described protector member 12 except that the upper portion incorporates extra protective cladding 52 formed of sheet metal or the like at the top and sides thereof.

Another embodiment of the invention is illustrated in FIGS. 6 and 7. In this arrangement, each protector member includes a pair of separate, elongated segments 60 spaced apart to define elongated, open-ended cavity or channel 62. Sheet material in the form of a sheet metal strap 64 is secured to the tops of elongated segments 60 by threaded mechanical fasteners. This not only serves to maintain the spacing between the elongated segments 60, but to close the top end of the cavity. The lower portion of this embodiment of the invention comprises high friction backing 66 having a slit 68 aligned with and disposed under the cavity 62. An arrangement of this type would be useful for heavy traffic loading and particularly when the cavity needs to be large enough to accommodate big cables or other elongated members. It should noted that the strap 64 extends across spaces or gaps between adjacent ends of elongated segments 60 to allow for bending between the protector members.

FIG. 8 illustrates another form of the invention wherein flexible sheet backing material 70 extends beyond and outwardly from the protector member sides. That is, the backing has portions 72, 74 engaged by a moving tire to clamp the flexible sheet material backing between the tire and the support surface during engagement of the moving tire with a tire engagement surface to prevent dislodgement of the protector member by the tire.

FIG. 9 illustrates an arrangement wherein a plurality of protector members 12 disposed into end-to-end are operatively associated with hold-down structure to increase the lateral stability of the apparatus. In particular, the hold-down structure comprises a plurality of cables 80 anchored to the ground outside the roadway edges by any suitable anchors, the other ends of the cables being connected to selected protector members 12 of the apparatus.

The invention claimed is:

1. Apparatus for positioning on a road or other support surface to protect one or more cables, cords, hoses, pipes or other elongated objects from traffic damage, said apparatus comprising, in combination:

a plurality of double-ended protector members disposed end to end, each said protector member defining at least one elongated, open-ended cavity extending between the ends thereof for receiving one or more elongated objects, and each said protector member having a protector member top, a protector member bottom having at least one elongated opening therein communicating with said at least one elongated, open-ended cavity and opposed protector member sides between said protector member top and said protector member bottom, said protector member sides having tire engagement surfaces slanting outwardly and downwardly whereby the force vector of a moving tire engaging a tire engagement surface will exert a downward force on the protector member urging said protector member in the direction of the support surface and increase frictional force between the support surface and the protector member to resist slidable movement of the protector member relative to the support surface; and flexible connector structure attached to said plurality of protector members and extending between adjacent ends thereof to maintain the protector members disposed end to end while enabling bending to occur between adjacent protector members whereby the apparatus will substantially conform to the shape of the support surface where the apparatus is positioned.

2. The apparatus according to claim 1 wherein said connector structure comprises flexible sheet material extending from the protector member bottoms of adjacent protector members and extending between adjacent ends thereof.

3. The apparatus according to claim 2 wherein said protector member bottoms comprise high friction sheet material, said flexible sheet material comprising portions of said high friction sheet material, said high friction sheet material defining said elongated openings of said protector members to facilitate positioning of one or more elongated objects in said protector members and removal of one or more elongated objects from said protector members.

4. The apparatus according to claim 2 wherein said flexible sheet material extends outwardly from at least one protector segment side of each protector member and is engageable by a moving tire to clamp the flexible sheet material between the tire and the support surface during engagement of said moving tire with a tire engagement surface to prevent dislodgement of said protector member by said tire.

5. The apparatus according to claim 4 wherein said flexible sheet material extends outwardly from both of said protector member sides.

6. The apparatus according to claim 2 wherein said flexible sheet material is integral and extends the combined length of said protector members.

7. The apparatus according to claim 1 wherein said connector structure comprises sheet material attached to the protector member tops of adjacent protector members and extending across spaces between adjacent ends thereof.

8. The apparatus according to claim 7 wherein said sheet material comprises sheet metal.

9. The apparatus according to claim 7 wherein each of said protector members includes separate, spaced, elongated segments defining at least one elongated, open-ended cavity, said sheet material extending over said at least one elongated, open-ended cavity and secured to both of said spaced, elongated segments.

10. The apparatus according to claim 9 wherein said connector structure additionally comprises sheet material under said spaced, elongated segments and under said at least one elongated, open-ended cavity.

11. The apparatus according to claim 10 wherein said sheet material under said spaced, elongated segments and under said at least one elongated, open-ended cavity defines said elongated opening to facilitate positioning of one or more elongated objects in said protector members and removal of one or more elongated objects from said protector members.

12. The apparatus according to claim 1 additionally comprising hold-down structure attached to said plurality of protector members for positively securing said protector members in place on said support surface.

13. The apparatus according to claim 12 wherein said hold-down structure comprises cables.

14. The apparatus according to claim 1 wherein each of said protector members defines a plurality of elongated, open-ended cavities extending between the ends thereof.

15. The apparatus according to claim 14 wherein the protector member bottom of each protector member has elongated openings communicating with each of said elongated, open-ended cavities.

16. The apparatus according to claim 1 wherein said connector structure comprises flexible sheet material extending between adjacent protector members across spaces therebetween.

17. The apparatus according to claim 1 wherein the protector member tops are at least partially covered by protective cladding.

* * * * *